(12) United States Patent
Ban et al.

(10) Patent No.: US 9,548,949 B2
(45) Date of Patent: *Jan. 17, 2017

(54) MESSAGE HANDLING MULTIPLEXER

(71) Applicant: Red Hat Inc., Raleigh, NC (US)

(72) Inventors: Bela Ban, Kreuzlingen (CH); Vladimir Blagojevic, Toronto (CA)

(73) Assignee: Red Hat, Inc., Raleigh, NC (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/109,133

(22) Filed: Dec. 17, 2013

(65) Prior Publication Data

US 2014/0105220 A1    Apr. 17, 2014

Related U.S. Application Data

(63) Continuation of application No. 11/807,624, filed on May 29, 2007, now Pat. No. 8,611,378.

(51) Int. Cl.
| | |
|---|---|
| *H04L 12/28* | (2006.01) |
| *H04J 3/04* | (2006.01) |
| *H04L 12/861* | (2013.01) |
| *H04L 12/18* | (2006.01) |

(52) U.S. Cl.
CPC .......... *H04L 49/90* (2013.01); *H04L 12/1881* (2013.01)

(58) Field of Classification Search
None
See application file for complete search history.

(56) References Cited

U.S. PATENT DOCUMENTS

| | | | |
|---|---|---|---|
| 5,627,892 A | 5/1997 | Kauffman | |
| 5,754,771 A | 5/1998 | Epperson et al. | |
| 5,771,289 A | 6/1998 | Kuzma | |
| 5,774,668 A * | 6/1998 | Choquier | G06F 9/505 370/480 |
| 5,793,975 A | 8/1998 | Zeldin | |
| 5,835,763 A * | 11/1998 | Klein | G06F 9/4843 718/101 |
| 6,035,205 A | 3/2000 | Han | |
| 6,104,716 A | 8/2000 | Crichton et al. | |
| 6,212,573 B1 | 4/2001 | Lim et al. | |
| 6,683,884 B1 | 1/2004 | Howard | |
| 6,765,878 B1 | 7/2004 | Carlson | |
| 6,839,748 B1 * | 1/2005 | Allavarpu | H04L 41/0213 709/223 |
| 6,885,638 B2 | 4/2005 | Xu et al. | |
| 6,886,041 B2 * | 4/2005 | Messinger | G06F 9/5038 709/203 |

(Continued)

OTHER PUBLICATIONS

Ban (Reliable Multicasting with the JGroups Toolkit—Dec. 27, 2006).*

(Continued)

*Primary Examiner* — Marsha D Banks Harold
*Assistant Examiner* — Christopher Wyllie
(74) *Attorney, Agent, or Firm* — Lowenstein Sandler LLP

(57) ABSTRACT

A method and apparatus for processing message is described. In one embodiment, an application programming interface is configured for receiving and sending messages. A multiplexer receives messages from different servers. A service name is coupled to each message with the corresponding destination service. A single shared channel is formed. The messages are processed over the single shared channel.

20 Claims, 8 Drawing Sheets

(56) References Cited

U.S. PATENT DOCUMENTS

| | | | |
|---|---|---|---|
| 6,898,617 B2 | 5/2005 | Dolittle et al. | |
| 6,944,662 B2 | 9/2005 | Devine et al. | |
| 6,985,958 B2 | 1/2006 | Lucovsky et al. | |
| 7,051,330 B1 | 5/2006 | Kaler et al. | |
| 7,065,646 B1 | 6/2006 | Hohensee | |
| 7,085,814 B1 | 8/2006 | Ghandi et al. | |
| 7,139,811 B2 | 11/2006 | Lev Ran et al. | |
| 7,197,751 B2 | 3/2007 | Fedotov et al. | |
| 7,207,043 B2 | 4/2007 | Blythe et al. | |
| 7,260,623 B2 | 8/2007 | Wookey et al. | |
| 7,330,891 B2 | 2/2008 | Yodaiken | |
| 7,400,581 B2 | 7/2008 | Masputra et al. | |
| 7,418,506 B1 | 8/2008 | Achtermann et al. | |
| 7,443,836 B2 | 10/2008 | Hooper | |
| 7,676,601 B2 * | 3/2010 | Smith | G06Q 40/04 709/213 |
| 7,733,863 B2 * | 6/2010 | Ban | H04L 47/10 370/389 |
| 7,921,227 B2 * | 4/2011 | Ban | H04L 12/1881 370/389 |
| 7,992,153 B2 * | 8/2011 | Ban | H04L 12/1813 719/313 |
| 8,505,028 B2 * | 8/2013 | Ban | H04L 47/10 705/400 |
| 8,611,378 B2 * | 12/2013 | Ban | H04L 12/1881 370/412 |
| 2001/0044339 A1 | 11/2001 | Cordero et al. | |
| 2002/0106065 A1 | 8/2002 | Joyce et al. | |
| 2002/0120697 A1 | 8/2002 | Generous et al. | |
| 2002/0152299 A1 * | 10/2002 | Traversat | G06F 9/4416 709/223 |
| 2003/0084097 A1 * | 5/2003 | Messinger | G06F 9/546 709/203 |
| 2003/0093499 A1 | 5/2003 | Messinger et al. | |
| 2003/0110230 A1 | 6/2003 | Holdsworth et al. | |
| 2003/0120595 A1 | 6/2003 | I'anson | |
| 2003/0152105 A1 | 8/2003 | Arimilli | |
| 2004/0023636 A1 | 2/2004 | Gurel | |
| 2004/0057434 A1 | 3/2004 | Poon et al. | |
| 2004/0174877 A1 | 9/2004 | Masputra et al. | |
| 2004/0177165 A1 | 9/2004 | Masputra et al. | |
| 2004/0260798 A1 | 12/2004 | Addington et al. | |
| 2005/0027793 A1 | 2/2005 | Hass | |
| 2005/0034137 A1 * | 2/2005 | Bartz | G06F 8/60 719/328 |
| 2005/0108331 A1 | 5/2005 | Osterman | |
| 2005/0157742 A1 * | 7/2005 | Chen | H04L 12/1886 370/432 |
| 2005/0235290 A1 | 10/2005 | Jefferson et al. | |
| 2006/0259585 A1 * | 11/2006 | Keohane | G06F 17/30899 709/219 |
| 2007/0088624 A1 | 4/2007 | Vaughn et al. | |
| 2007/0174474 A1 | 7/2007 | Zhong et al. | |
| 2007/0183418 A1 | 8/2007 | Riddoch et al. | |
| 2007/0204273 A1 | 8/2007 | Chen et al. | |
| 2008/0098321 A1 | 4/2008 | Krithivas | |
| 2008/0108437 A1 | 5/2008 | Kaarela et al. | |
| 2008/0134043 A1 | 6/2008 | Georgis et al. | |
| 2008/0298355 A1 * | 12/2008 | Ban | H04L 47/10 370/389 |
| 2008/0298363 A1 * | 12/2008 | Ban | H04L 12/1881 370/390 |
| 2008/0301706 A1 * | 12/2008 | Ban | H04L 47/10 719/313 |
| 2008/0301709 A1 * | 12/2008 | Ban | H04L 12/1813 719/314 |
| 2009/0157817 A1 * | 6/2009 | Williamson | H04L 12/1827 709/206 |
| 2010/0211753 A1 * | 8/2010 | Ylonen | G06F 12/0253 711/165 |
| 2012/0066313 A1 * | 3/2012 | Ban | G06F 9/546 709/206 |

OTHER PUBLICATIONS

USPTO, Office Action for U.S. Appl. No. 11/809,258 mailed May 9, 2011.
USPTO, Final Office Action for U.S. Appl. No. 11/809,258 mailed Oct. 25, 2011.
USPTO, Advisory Action for U.S. Appl. No. 11/809,258 mailed Dec. 28, 2011.
USPTO, Notice of Allowance for U.S. Appl. No. 11/809,258 mailed Mar. 29, 2013.
Bela Ban, Reliable Multicasting with the Jgroups Toolkit Dec. 27, 2006.
Lever, C. et al. (Nov. 16, 2000). "An Analysis of the TUX Web Server," CITI Technical Report 00-8, 13 pages.
Ouyang, "Method for processing extra-long message in two-layer virtual special-purpose network," 2005.
USPTO, Notice of Allowance for U.S. Appl. No. 11/809,225 mailed Nov. 26, 2010.
USPTO, Notice of Allowance for U.S. Appl. No. 11/809,076 mailed Feb. 12, 2010.
USPTO, Final Office Action for U.S. Appl. No. 11/809,225 mailed Feb. 2, 2010.
USPTO, Office Action for U.S. Appl. No. 11/809,225 mailed May 13, 2010.
USPTO, Office Action for U.S. Appl. No. 11/809,225 mailed Jul. 9, 2009.
USPTO, Office Action for U.S. Appl. No. 11/809,076 mailed Jul. 9, 2009.
Ban Bela, JavaGroups User's Guide, Nov. 16, 2002. 39 pages.
Ban Bela. JavaGroups—Group Communication Patterns in Java, Department of Computer Science Cornell University, Jul. 31, 1998. 18 pages.
USPTO, Office Action for U.S. Appl. No. 11/807,624 mailed Jul. 9, 2009.
USPTO, Office Action for U.S. Appl. No. 11/807,624 mailed Jan. 21, 2011.
USPTO, Final Office Action for U.S. Appl. No. 11/807,624 mailed Jan. 14, 2010, 25 pages.
USPTO, Final Office Action for U.S. Appl. No. 11/807,624 mailed Jul. 20, 2011.
USPTO, Office Action for U.S. Appl. No. 11/807,624 mailed Feb. 29, 2012.
USPTO, Final Office Action for U.S. Appl. No. 11/807,624 mailed Jun. 15, 2012.
USPTO, Advisory Action for U.S. Appl. No. 11/807,258 mailed Oct. 11, 2012.
USPTO, Office Action for U.S. Appl. No. 11/809,020 mailed Sep. 28, 2010.
USPTO, Notice of Allowance for U.S. Appl. No. 11/807,624 mailed Sep. 11, 2013.

* cited by examiner

MESSAGE HANDLING MULTIPLEXER

RELATED APPLICATIONS

This application is a continuation of U.S. patent application Ser. No. 11/807,624, filed May 29, 2007 which is incorporated by reference in its entirety.

TECHNICAL FIELD

Embodiments of the present invention relate to group communication, and more specifically to parallel processing of messages.

BACKGROUND

Group communication protocol designed for multicast communication may be used to communicate messages between endpoints forming a group. Communication endpoints can be processes or objects, or any entity that can send and receive messages to/from a group.

However, messages from different senders are conventionally processed in a First In First Out (FIFO) order in a single queue for incoming messages by one thread. The messages are processed sequentially in the order they are received. A bottleneck may thus be formed since every message has to wait for its turn to be processed accordingly.

BRIEF DESCRIPTION OF THE DRAWINGS

The present invention is illustrated by way of example, and not by way of limitation, in the figures of the accompanying drawings and in which.

DETAILED DESCRIPTION

Figure 1:
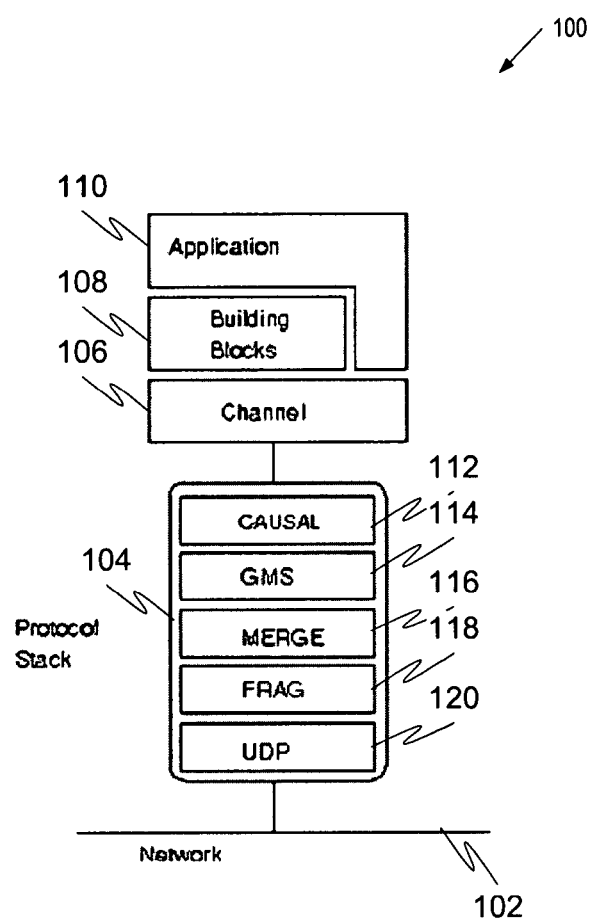
FIG. 1 illustrates a network architecture of a group communication in which embodiments of the present invention may be implemented.

Described herein is a method and apparatus for processing messages using a multiplexer. The multiplexer may receive messages or services from several senders. A service name is coupled to each message with the corresponding destination service. A single shared channel is formed to process the messages.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Group Communication Architecture

FIG. 1 illustrates an exemplary network architecture of a group communication 100, such as JGroup, in which embodiments of the present invention may operate.

JGroups is toolkit for reliable group communication. Processes can join a group, send messages to all members or single members and receive messages from members in the group. The system keeps track of the members in every group, and notifies group members when a new member joins, or an existing member leaves or crashes. A group is identified by its name. Groups do not have to be created explicitly; when a process joins a non-existing group, that group will be created automatically. Member processes of a group can be located on the same host, within the same LAN, or across a WAN. A member can be part of multiple groups.

The group communication architecture may comprise three parts: (1) a channel API 106 used by application programmers to build reliable group communication applications, (2) building blocks 108, which are layered on top of channel 106 and provide a higher abstraction level and (3) a protocol stack 104, which implements the properties specified for a given channel.

Channel 106 is connected to protocol stack 104. Whenever an application sends a message, channel 106 passes it on to protocol stack 104 comprising several protocols 112, 114, 116, 118, 120. The topmost protocol processes the message and the passes it on to the protocol below it. Thus, the message is handed from protocol to protocol until the bottom protocol puts it on the network 102. The same happens in the reverse direction: the bottom (transport) protocol listens for messages on network 102. When a message is received, it will be handed up protocol stack 104 until it reaches channel 106. Channel 106 stores the message in a queue until application 110 consumes it.

When an application 110 connects to a channel 106, protocol stack 106 will be started, and when it disconnects protocol stack 104 will be stopped. When the channel 106 is closed, the stack 140 will be destroyed, releasing its resources.

Channel

To join a group and send messages, a process has to create a channel and connect to it using the group name (all channels with the same name form a group). The channel is the handle to the group. While connected, a member may send and receive messages to/from all other group members. The client leaves a group by disconnecting from the channel. A channel can be reused: clients can connect to it again after having disconnected. However, a channel may allow only one client to be connected at a time. If multiple groups are to be joined, multiple channels can be created and connected to. A client signals that it no longer wants to use a channel by closing it. After this operation, the channel may not be used any longer.

Each channel has a unique address. Channels always know who the other members are in the same group: a list of member addresses can be retrieved from any channel. This list is called a view. A process can select an address from this list and send a unicast message to it (also to itself), or it may send a multicast message to all members of the current view. Whenever a process joins or leaves a group, or when a crashed process has been detected, a new view is sent to all remaining group members. When a member process is suspected of having crashed, a suspicion message is received by all non-faulty members. Thus, channels receive regular messages, view messages and suspicion messages. A client may choose to turn reception of views and suspicions on/off on a channel basis.

Channels may be similar to BSD sockets: messages are stored in a channel until a client removes the next one (pull-principle). When no message is currently available, a client is blocked until the next available message has been received.

A channel may be implemented over a number of alternatives for group transport. Therefore, a channel is an abstract class, and concrete implementations are derived from it, e.g. a channel implementation using its own protocol stack, or others using existing group transports such as Jchannel and EnsChannel. Applications only deal with the abstract channel class, and the actual implementation can be chosen at startup time.

The properties for a channel may be specified in a colon-delimited string format. When creating a channel (JChannel) a protocol stack will be created according to these properties. All messages will pass through this stack, ensuring the quality of service specified by the properties string for a given channel.

Building Blocks

Channels are simple and primitive. They offer the bare functionality of group communication, and have on purpose been designed after the simple model of BSD sockets, which are widely used and well understood. The reason is that an application can make use of just this small subset of JGroups, without having to include a whole set of sophisticated classes, that it may not even need. Also, a somewhat minimalistic interface is simple to understand: a client needs to know about 12 methods to be able to create and use a channel (and oftentimes will only use 3-4 methods frequently).

Channels provide asynchronous message sending/reception, somewhat similar to UDP. A message sent is essentially put on the network and the send( ) method will return immediately. Conceptual requests, or responses to previous requests, are received in undefined order, and the application has to take care of matching responses with requests.

Also, an application has to actively retrieve messages from a channel (pull-style); it is not notified when a message has been received. Note that pull-style message reception often needs another thread of execution, or some form of event-loop, in which a channel is periodically polled for messages.

JGroups offers building blocks that provide more sophisticated APIs on top of a Channel. Building blocks either create and use channels internally, or require an existing channel to be specified when creating a building block. Applications communicate directly with the building block, rather than the channel. Building blocks are intended to save the application programmer from having to write tedious and recurring code, e.g. request-response correlation.

Protocol Stack

As discussed above, JGroups provides two channel implementations: an Ensemble-based channel and its own channel based on a Java protocol stack. The latter is a protocol stack containing a number of protocol layers in a bidirectional list. FIG. 1 illustrates protocol stack 104 with the following procotols: CAUSAL 112, GMS 114, MERGE 116, FRAG 118, UDP 120.

All messages sent and received over the channel have to pass through the protocol stack. Every layer may modify, reorder, pass or drop a message, or add a header to a message. A fragmentation layer might break up a message into several smaller messages, adding a header with an id to each fragment, and re-assemble the fragments on the receiver's side.

The composition of the protocol stack, i.e. its layers, is determined by the creator of the channel: a property string defines the layers to be used (and the parameters for each layer). This string might be interpreted differently by each channel implementation; in JChannel it is used to create the stack, depending on the protocol names given in the property.

Knowledge about the protocol stack is not necessary when only using channels in an application. However, when an application wishes to ignore the default properties for a protocol stack, and configure their own stack, then knowledge about what the individual layers are supposed to do is needed. Although it is syntactically possible to stack any layer on top of each other (they all have the same interface), this wouldn't make sense semantically in most cases.

Message

Figure 2:
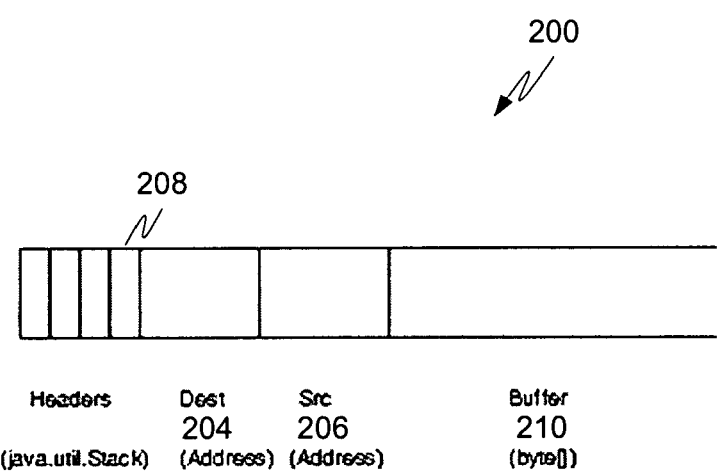
FIG. 2 illustrates a block diagram of one embodiment of a structure of a message.

Data is sent between members in the form of messages. A message can be sent by a member to a single member, or to all members of the group of which the channel is an endpoint. An example of a structure of a message 200 is illustrated in FIG. 2.

The message 200 may contain five fields: headers 202, destination address 204, source address 206, flags 208, and payload 210.

A list of headers 202 can be attached to a message. Anything that should not be in the payload 210 can be attached to message 200 as a header. Methods putHeader( ), getHeader( ), and removeHeader( ) of message 200 can be used to manipulate headers 202.

The destination address 204 may include the address of the receiver. If null, the message will be sent to all current group members.

The source address 206 may include the address of a sender. It can be left null, and will be filled in by the transport protocol (e.g. UDP) before the message is put on the network 102.

One byte of the message 200 may be used for flags 208. Examples of flags may be OOB, LOW_PRIO and HIGH_PRIO.

The payload 210 may include the actual data (as a byte buffer). The message class contains convenience methods to set a serializable object and to retrieve it again, using serialization to convert the object to/from a byte buffer.

The message 200 may be similar to an IP packet and consists of the payload (a byte buffer) and the addresses of the sender and receiver (as addresses). Any message put on the network 102 can be routed to its destination (receiver address), and replies can be returned to the sender's address.

A message usually does not need to fill in the sender's address when sending a message; this is done automatically by the protocol stack before a message is put on the network. However, there may be cases, when the sender of a message wants to give an address different from its own, so that for example, a response should be returned to some other member.

The destination address (receiver) can be an Address, denoting the address of a member, determined e.g. from a message received previously, or it can be null, which means that the message will be sent to all members of the group. A typical multicast message, sending string "Hello" to all members would look like this:

Message msg=new Message(null, null, "Hello".get Bytes( ));
    channel.send(msg);

Channel States

Figure 3:
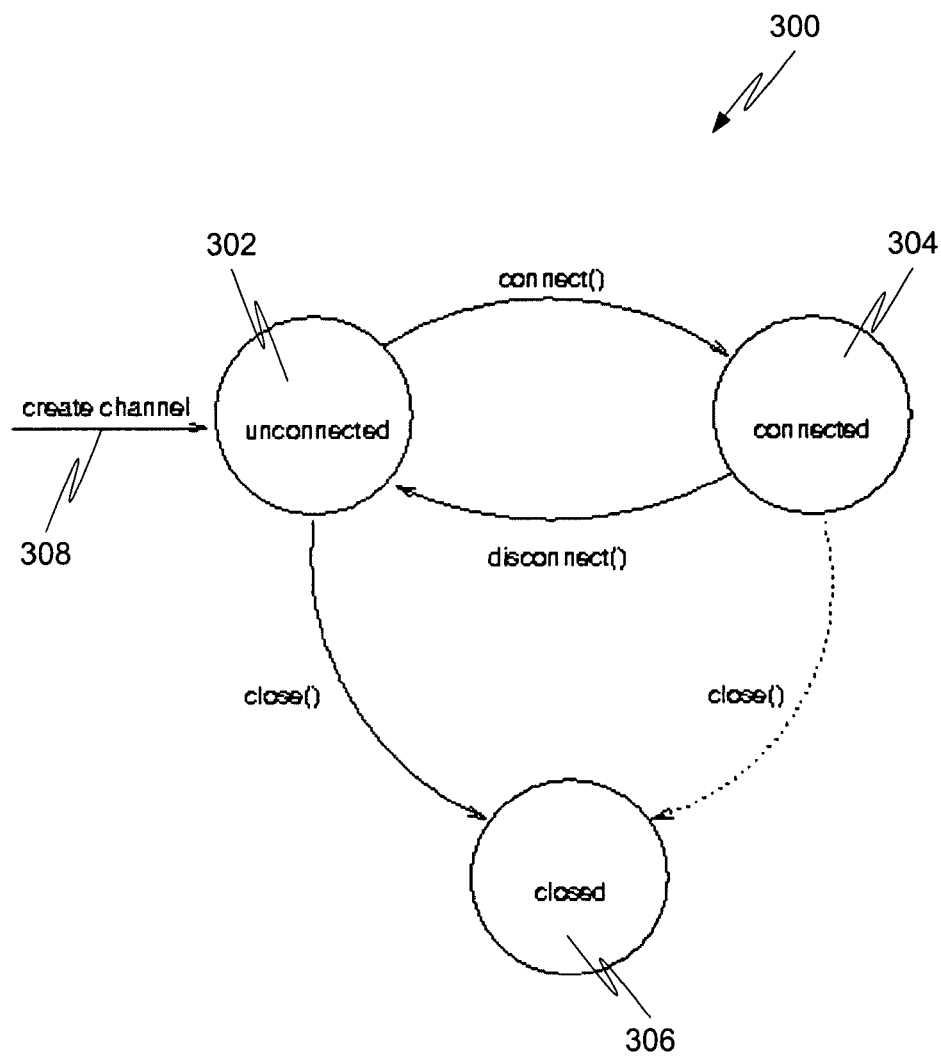
FIG. 3 illustrates a block diagram of one embodiment of channel states.

A state transition diagram 300 for the major states a channel can assume are shown in FIG. 3. In order to join a group and send messages, a process has to create a channel. A channel is like a socket. When a client connects to a channel, it gives the name of the group it would like to join.

Thus, a channel is (in its connected state) always associated with a particular group. The protocol stack takes care that channels with the same group name find each other: whenever a client connects to a channel given group name G, then it tries to find existing channels with the same name, and joins them, resulting in a new view being installed (which contains the new member). If no members exist, a new group will be created.

When a channel is first created at 308, it is in the unconnected state 302. An attempt to perform certain operations which are only valid in the connected state (e.g. send/receive messages) will result in an exception. After a successful connection by a client, it moves to the connected state 304. Now channels will receive messages, views and suspicions from other members and may send messages to other members or to the group. Getting the local address of a channel is guaranteed to be a valid operation in this state (see below). When the channel is disconnected, it moves back to the unconnected state 302. Both a connected and unconnected channel may be closed 306, which makes the channel unusable for further operations. Any attempt to do so will result in an exception. When a channel is closed directly from a connected state, it will first be disconnected, and then closed.

Concurrent Stack

Figure 4:
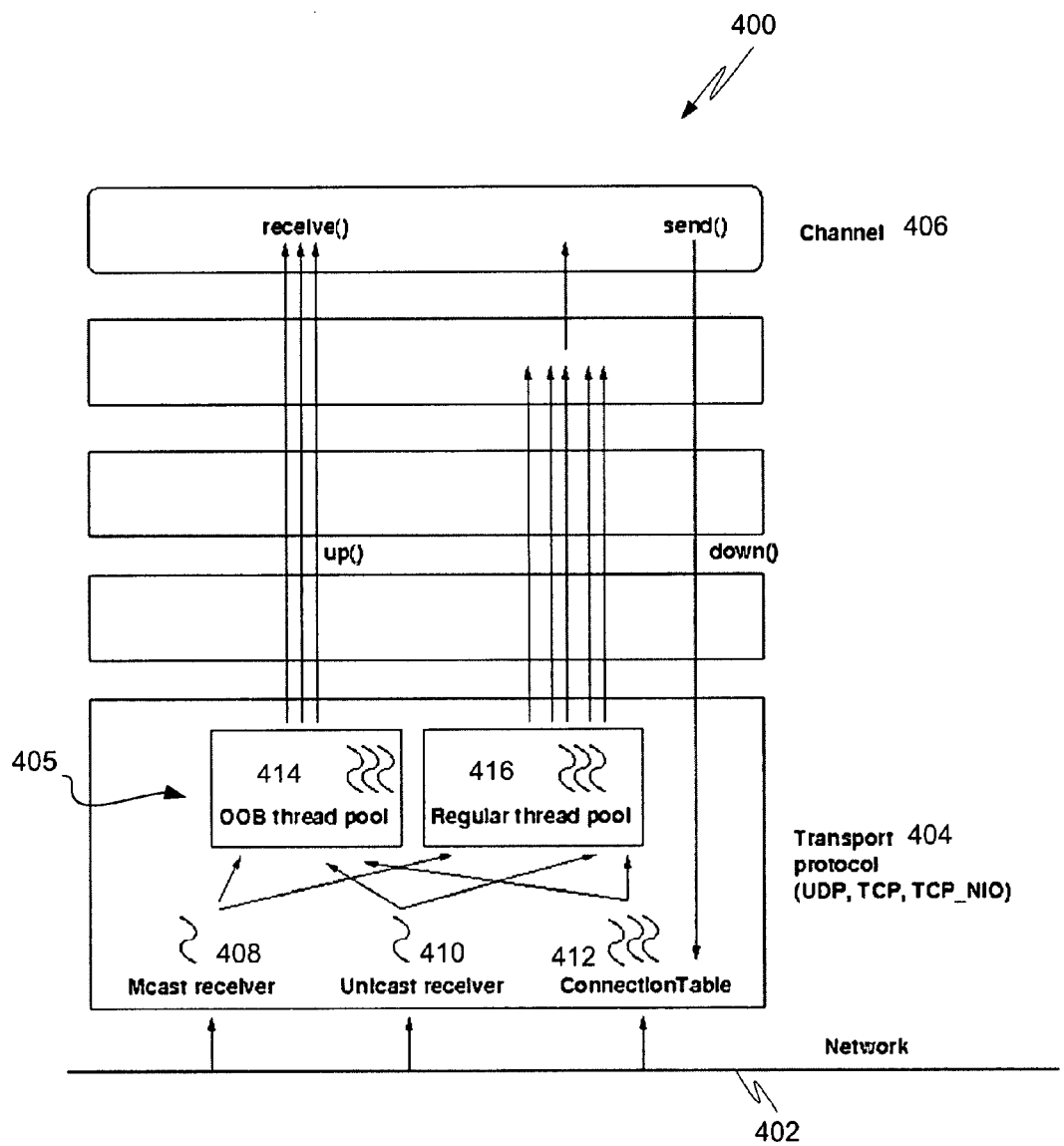
FIG. 4 illustrates a block diagram of one embodiment of a concurrent stack.

The architecture 400 of one embodiment of a concurrent stack 405 is shown in FIG. 4. As previously discussed, channel 406 communicate with transport protocol 404 to a network 402. However, transport protocol 404 may include the following protocols: TP, with subclasses UDP, TCP and TCP_NIO. Therefore, to configure the concurrent stack, the user has to modify the config for (e.g.) UDP in the XML file.

Concurrent stack 405 consists of two thread pools: an out-of-band (OOB) thread pool 414 and a regular thread pool 416. Packets are received from Multicast receiver 408, Unicast receiver 410, or a Connection Table 412 (TCP, TCP_NIO). Packets marked as OOB (with Message.setFlag (Message.OOB)) are dispatched to the OOB thread pool 414, and all other packets are dispatched to the regular thread pool 416.

When a thread pool is disabled, then the thread of the caller (e.g. multicast or unicast receiver threads or the ConnectionTable) is used to send the message up the stack and into the application. Otherwise, the packet will be processed by a thread from the thread pool, which sends the message up the stack. When all current threads are busy, another thread might be created, up to the maximum number of threads defined. Alternatively, the packet might get queued up until a thread becomes available.

The point of using a thread pool is that the receiver threads should only receive the packets and forward them to the thread pools for processing, because unmarshalling and processing is slower than simply receiving the message and can benefit from parallelization.

Previously, all messages received were processed by a single thread, even if the messages were sent by different senders. For instance, if sender A sent messages 1, 2 and 3, and B sent message 34 and 45, and if A's messages were all received first, then B's messages 34 and 35 could only be processed after messages 1-3 from A were processed.

Now, messages from different senders can be processed in parallel, e.g. messages 1, 2 and 3 from A can be processed by one thread from the thread pool and messages 34 and 35 from B can be processed on a different thread.

As a result, a speedup of almost N for a cluster of N if every node is sending messages may be obtained. The thread pool may be configured to have at least N threads.

Computer System

Figure 5:
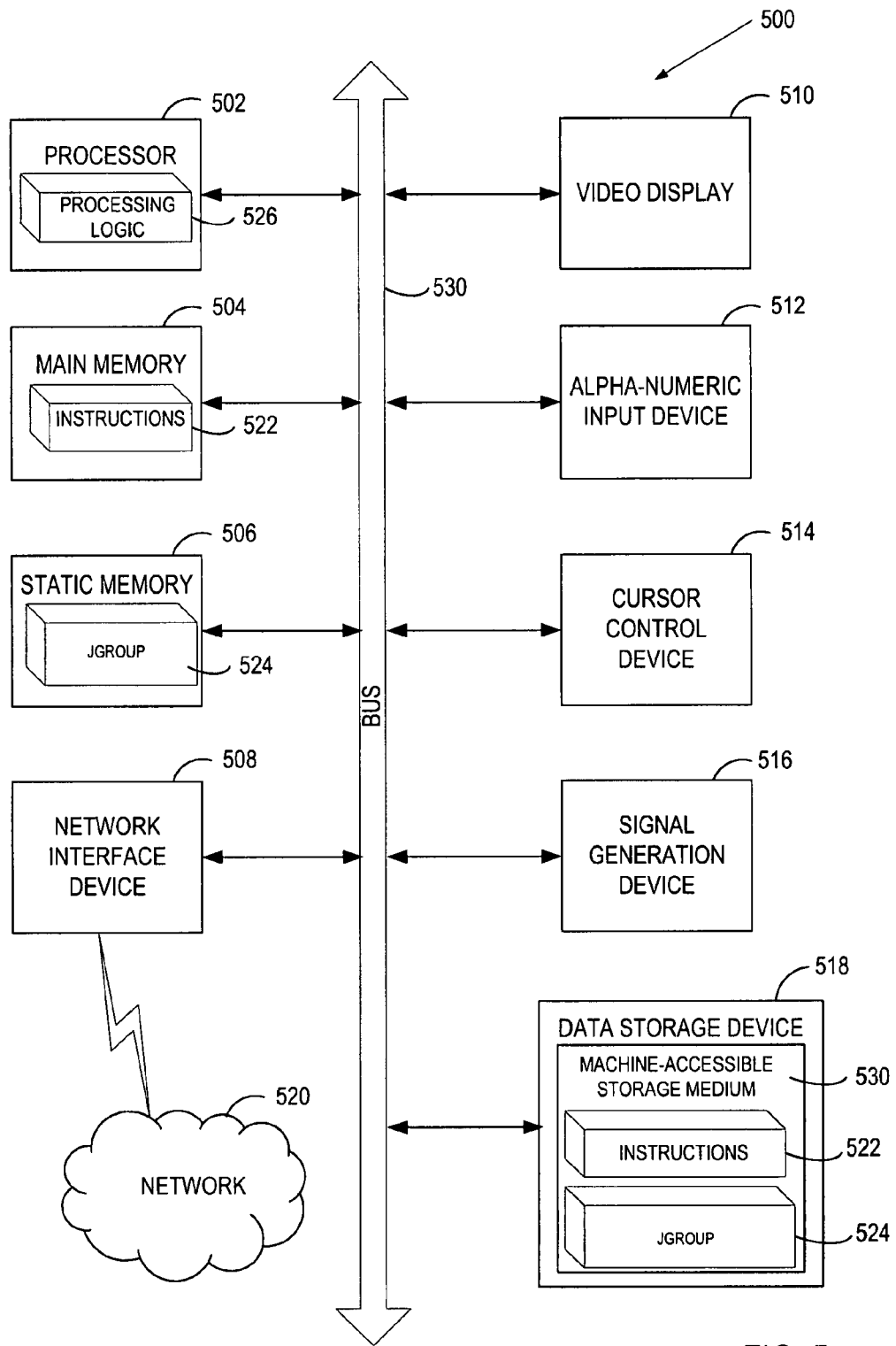
FIG. 5 illustrates a block diagram of an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to JGroup and concurrent stack configurations 524. JGroup and concurrent stack configurations 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Multiplexer

Several JGroups channels may be formed; one for each application (e.g. JBossCache, ClusterPartition etc). A multiplexer may combine all stacks with the same configuration into one, and have multiple services on top of that same channel.

To do this, the multiplexer may include multiplexing and demultiplexing functionality, ie. each service will have to have a unique service ID (a string), and when sending a message, the message has to be tagged with that ID. When receiving a message, it will be dispatched to the right destination service based on the ID attached to the message. Special handling for VIEW and SUSPECT messages may be required: those need to be dispatched to all services. State transfer also needs to be handled specially, here we probably have to use thread locals, or change the API (TBD).

When deployed into JBoss, the Multiplexer will be exposed as an MBean, and all services that depend on it will be deployed with dependency injection on the Multiplexer. The old configuration will still be supported.

The config of the Multiplexer is done via a config file, which lists a number of stacks, each keyed by a name, e.g. "udp", "tcp", "tcp-nio" etc. An app is configured with the name of a stack, e.g. "udp", and a reference to the Multiplexer MBean. It will get a proxy channel through which all of its communication will take place. The proxy channel (MuxChannel) will mux/demux messages to the real JGroups channel.

The advantage of the Multiplexer is that we can reduce N channels into M where M<N. This means fewer threads, therefore fewer context switches, less memory consumption and easier configuration and better support.

The Multiplexer is actually a JChannelFactory, which is configured with a reference to an XML configuration file, and has a few additional methods to get a Channel. The channel returned is actually an instance of MuxChannel, which transparently forwards all invocations to the underlying JChannel, and performs multiplexing and demultiplexing. Multiple MuxChannels can share the same underlying JChannel, and each message sent by a service over the MuxChannel will add the services's ID to the message (as a header). That ID is then used to demultiplex the message to the correct MuxChannel when received.

The methods of the JChannelFactory are:
public Channel createMultiplexerChannel(String stack_name, String id) throws Exception;
public Channel createMultiplexerChannel(String stack_name, String id, boolean register_for_state_transfer, String substate_id) throws Exception;

The stack_name parameter refers to a channel configuration defined in a separate file (see below).

The id parameter is the service ID and has to be unique for all services sitting on the same channel. If an ID is used more than once, when trying to call createMultiplexerChannel( ) an exception will be thrown.

The stack_name parameter is a reference to a stack, for example defined in stacks.xml. A shortened version of stacks.xml is shown below:

```
<protocol_stacks>
    <stack name="fc-fast-minimalthreads" description="Flow control, no up or down threads">
        <config>
            <UDP  mcast_port="45566"
                enable_bundling="true"/>
            ...
            <pbcast.STATE_TRANSFER down_thread="false" up_thread="false"/>
        </config>
    </stack>
    <stack name="sequencer" description="Totally ordered multicast using a sequencer">
        <config>
            // config
        </config>
    </stack>
    <stack name="tcp" description="Using TCP as transport">
        <config>
            <TCP start_port="7800" loopback="true" send_buf_size="100000" recv_buf_size="200000"/>
            <TCPPING timeout="3000" initial_hosts="localhost[7800]" port_range="3" num_initial_members="3"/>
            <FD timeout="2000" max_tries="4"/>
            <VERIFY_SUSPECT timeout="1500" down_thread="false" up_thread="false"/>
            <pbcast.NAKACK gc_lag="100" retransmit_timeout="600,1200,2400,4800"/>
            <pbcast.STABLE stability_delay="1000" desired_avg_gossip="20000" down_thread="false" max_bytes="0" up_thread="false"/>
            <VIEW_SYNC avg_send_interval="60000" down_thread="false" up_thread="false" />
            <pbcast.GMS print_local_addr="true" join_timeout="5000" join_retry_timeout="2000" shun="true"/>
        </config>
    </stack>
    <stack name="discovery" description="Simple UDP-only stack for discovery">
        <config>
            <UDP mcast_port="7609"
                use_incoming_packet_handler="false"
                mcast_addr="228.15.15.15"
                use_outgoing_packet_handler="false"
                ip_ttl="32"/>
        </config>
    </stack>
</protocol_stacks>
```

This file defines 4 configurations: fc-fast-minimalthreads, sequencer, tcp and discovery. The first service to call JChannelFactory.createMultiplexerChannel( ) with a stack_name of "tcp" will create the JChannel with the "tcp" configuration, all subsequent method calls for the same stack_name ("tcp") will simply get a MuxChannel which has a reference to the same underlying JChannel. When a service closes a MuxChannel, the underlying JChannel will only be closed when there are no more MuxChannels referring to it.

Batching State Transfers

The call sequence is indeterministic unless all dependent beans are defined in the same XML file, which is unrealistic. We're looking into using a barrier service to provide the guarantee that all create( ) methods are called before all start( ) methods.

When multiple services are sharing a JChannel, and each of the services requires state transfer at a different time, then we need FLUSH. FLUSH is also called the stop-the-world model, and essentially stops everyone in a group from sending messages until the state has been transferred, and then everyone can resume again.

The 2.3 release of JGroups will not have the FLUSH protocol integrated, so state transfer for the Multiplexer might be incorrect. 2.4 will have FLUSH, so that situation will be corrected. The main reason for putting Multiplexing into 2.3 is that people can start programming against the API, and then use it when FLUSH is available.

When multiple services share one JChannel, then we have to run the FLUSH protocol for every service which requires state, so if we have services A, B, C, D and E running on top of a JChannel J, and B, C and E require state, then the FLUSH protocol has to be run 3 times, which slows down startup (e.g.) of JBoss.

To remedy this, we can batch state transfers, so that we suspend everyone from sending messages, then fetch the states for B, C and E at once, and then resume everyone. Thus, the FLUSH protocol has to be run only once.

To do this, a service has to register with the JChannelFactory when creating the MuxChannel, and know that getState( ) will be a no-op until the last registered application has called getState( ). This works as follows:

B, C and D register for state transfer
B calls MuxChannel.getState( ). Nothing happens.
D calls MuxChannel.getState( ). Nothing happens.
E calls MuxChannel.getState( ). Now everyone who registered has called getState( ) and therefore we transfer the state for B, C and E (using partial state transfer).
At this point B, C and D's setState( ) will be called, so that they can set the state. The code below (a snipper from MultiplexerTest) shows how services can register for state transfers. In an MBean (JBoss) environment, the registration could be done in the create( ) callback, and the actual getState( ) call in start( ).

```
public void testStateTransferWithRegistration( ) throws Exception {
    final String STACK_NAME="fc-fast-minimalthreads";
    Channel ch1, ch2;
    ch1=factory.createMultiplexerChannel(STACK_NAME, "c1", true, null); // register for (entire) state transfer
    ch1.connect("bla"); // will create a new JChannel
    ch2=factory.createMultiplexerChannel(STACK_NAME, "c2", true, null); // register for (entire) state transfer
    ch2.connect("bla"); // will share the JChannel created above (same STACK_NAME)
    boolean rc=ch1.getState(null, 5000); // this will *not* trigger the state transfer protocol
    rc=ch2.getState(null, 5000); // only *this* will trigger the state transfer
}
```

The example above shows that 2 services ("c1" and "c2") share a common JChannel because they use the same stack_name (STACK_NAME). It also shows that only the second getState( ) invocation will actually transfer the 2 states (for "c1" and "c2").

Service Views

When we have multiple service running on the same channel, then some services might get redeployed or stopped independently from the other services. So we might have a situation where we have services S1, S2 and S3 running on host H1, but on host H2, only services S2 and S3 are running.

The cluster view is {H1, H2}, but the service views are:
S1: {H1}
S2: {H1, H2}
S3: {H1, H2}

This can also be seen as ordered by hosts:

H1: {S1, S2, S3}

H2: {S2, S3}

So here we host H1 running services S1, S2 and S3, whereas H2 is only running S2 and S3. S1 might be in the process of being redeployed on H2, or is simply not running.

A service view is essentially a list of nodes of a cluster on which a given service S is currently running. Service views are always subsets of cluster views. Here's a reason we need service views: consider the example above. Let's say service S1 on H1 wants to make a cluster-wide method invocation on all instances of S1 running on any host. Now, S1 is only running on H1, therefore we have to make the invocation only on S1. However, if we took the cluster view rather than the service view, the invocation would be across H1 and H2, and we'd be waiting for a response from the (non-existent) service S1 on H2 forever.

So, by default, calling MuxChannel.getView( ) will return the service view rather than the cluster view. The cluster view can be retrieved calling MuxChannel.getCluster View( ).

Figure 6:
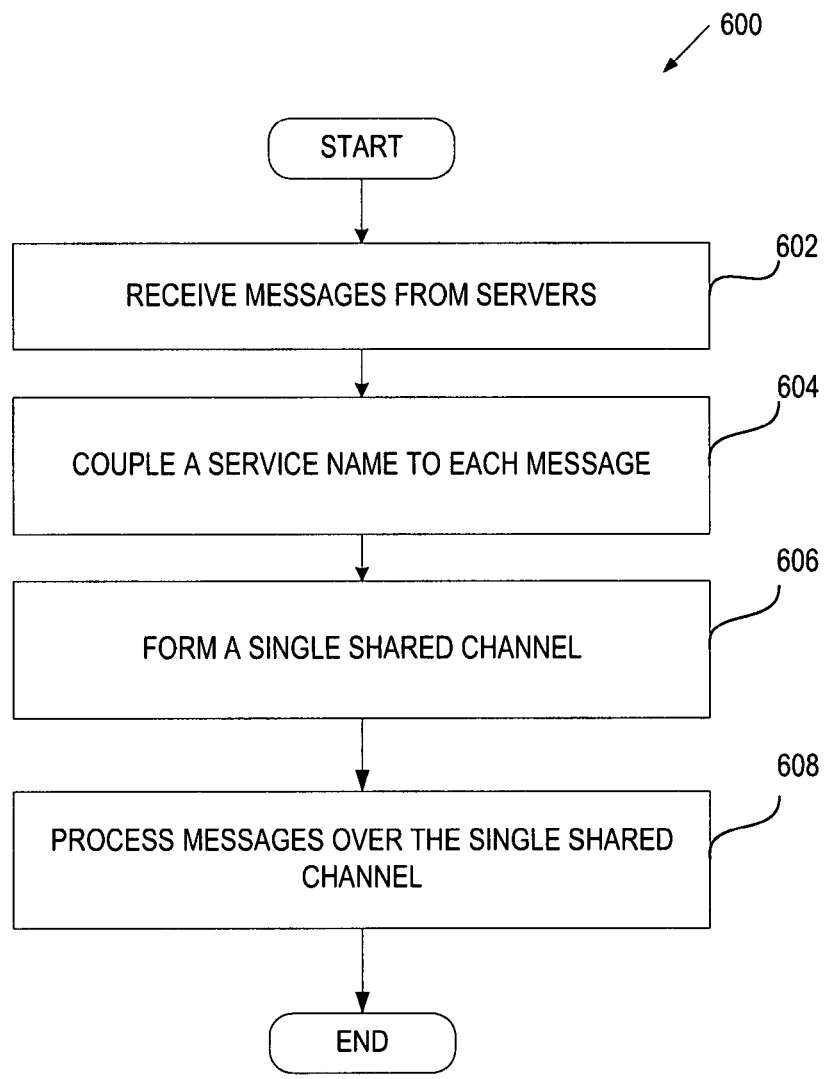
FIG. 6 illustrates a flow diagram of one embodiment of a method for processing messages.

FIG. 6 is a flow diagram illustrating a computer-implemented method for processing messages. The group communication toolkit may be written in Java to provide reliable multicast communication. At 602, a multiplexer receives messages from different servers or services. At 604, a service name is couple to each message. At 606, a single shared channel is formed. At 608, the messages are processed with the single shared channel.

Figure 7:
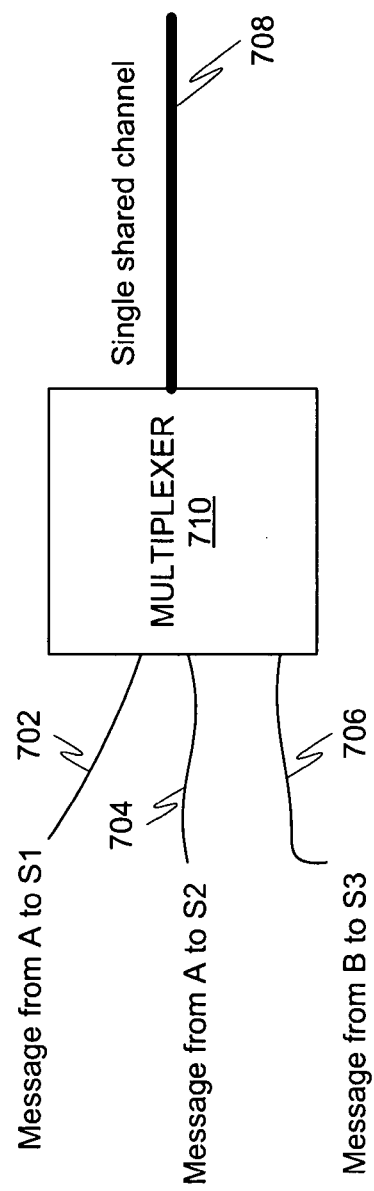
FIG. 7 illustrates a block diagram of one embodiment of a multiplexer.
Figure 8:
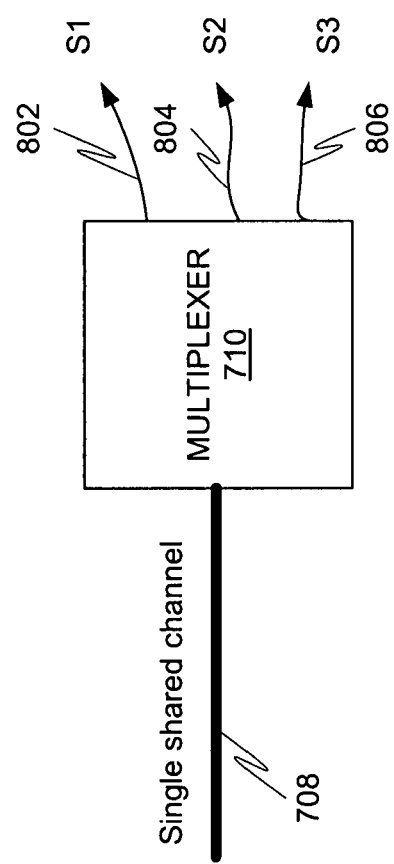
FIG. 8 illustrates a block diagram of another embodiment of a multiplexer.

FIGS. 7 and 8 are different embodiments of a multiplexer 710. With a multiplexer, a situation may arise as follow. Three servers (A, B, and C) all running three services S1, S2, and S3 that share a mux channel 708. S1 may be an instance of Jboss Cache. S1 sends a replication message to the cluster. On B, the thread carrying the message blocks wait to acquire a lock in JBoss Cache. The ordering protocols in B's channel will prevent B.S2 and B.S3 receiving any further messages from A until the lock is acquired on S1 or the attempt times out.

One could deal with this at the MessageDispatcher/RequestCorrelator level, but a simpler solution is to add asynchronous message handling in Multiplexer. A set of (bounded) queues is maintained in the Multiplexer, one per service. When messages arrive in Multiplexer.up( ), the message is added to the queue, and the JGroups up thread returns. Multiplexer maintains a thread pool that reads messages off the queues and passes them up to the mux channel. The use of queues ensures the messages are received in FIFO order at the application level.

It is still possible that one service could block others, if it's queue is full. We need to determine exactly how to size the queues—i.e. based on number of bytes of queued messages, or based on number of messages. An application could then configure the size of its queue such that the queue shouldn't fill under expected load during any normal events (e.g. a JBC queue should be configured not to fill during the normal lock acquisition timeout.)

Thus, a method and apparatus for processing messages has been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

receiving messages from a plurality of servers by a processing device executing a multiplexer, wherein the multiplexer comprises a concurrent transport protocol stack;

coupling, by the processing device executing the multiplexer, a service name to each message with a corresponding destination service;

maintaining, by the processing device executing the multiplexer, a set of queues, one queue per service name;

adding, by the processing device executing the multiplexer, a message to a corresponding queue in view of the service name of the corresponding queue, to form a single shared channel;

maintaining, by the processing device executing the multiplexer, an out-of-band thread pool and a regular thread pool of the concurrent transport protocol stack, wherein the out-of-band thread pool and the regular thread pool are coupled to receive the messages from the set of queues;

dispatching the messages marked as out-of-band from a sender to a thread of the out-of-bound thread pool; and dispatching all other messages from the sender to a thread of the regular thread pool.

2. The method of claim 1 further comprising:

multiplexing the messages onto the single shared channel; and sending the messages over the single shared channel.

3. The method of claim 1 further comprising:

determining the service name for each message from the single shared channel; and channeling each message to the corresponding destination service based on the service name of each message.

4. The method of claim 1 further comprising concurrently dispatching messages to different services from a same server using the concurrent transport protocol stack.

5. The method of claim 4 further comprising processing one thread of the concurrent stack for messages to a same service from the same server.

6. The method of claim 1 wherein receiving messages comprise packets with concurrent transport protocol stack, wherein the concurrent transport protocol stack comprises at least one of a multicast receiver thread, a unicast receiver thread, or a connection table.

7. The method of claim 1 further comprising sending the messages up the concurrent transport protocol stack to a corresponding channel of a channel layer of the multiplexer, from the channel layer to a building block layer of the multiplexer, the building block layer layered on top of the channel layer, and from the building block layer to an application programming interface of the multiplexer, the application programming interface layered on top of the building block.

8. A non-transitory machine-accessible storage medium comprising data that, when accessed by a processing device, cause the processing device to:

receive messages from a plurality of servers by the processing device executing a multiplexer, wherein the multiplexer comprises a concurrent transport protocol stack;

couple, by the processing device executing the multiplexer, a service name to each message with a corresponding destination service;

maintain, by the processing device executing the multiplexer, a set of queues, one queue per service name;

add, by the processing device executing the multiplexer, a message to a corresponding queue in view of the service name of the corresponding queue, to form a single shared channel;

maintain, by the processing device executing the multiplexer, an out-of-band thread pool and a regular thread pool of the concurrent transport protocol stack, wherein the out-of-band thread pool and the regular thread pool are coupled to receive the messages from the set of queues;

dispatch the messages marked as out-of-band from a sender to a thread of the out-of-bound thread pool; and dispatch all other messages from the sender to a thread of the regular thread pool.

9. The non-transitory machine-accessible storage medium of claim 8 wherein the data that, when accessed by the processing device, further causes the processing device to:

multiplex the messages onto the single shared channel; and send the messages over the single shared channel.

10. The non-transitory machine-accessible storage medium of claim 8 wherein the data that, when accessed by the processing device, further causes the processing device to:

determine the service name for each message from the single shared channel; and channel each message to the corresponding destination service in view of the service name of each message.

11. The non-transitory machine-accessible storage medium of claim 8 wherein the data that, when accessed by the processing device, further causes the processing device to dispatch concurrently messages to different services from a same server using the concurrent transport protocol stack.

12. The non-transitory machine-accessible storage medium of claim 11 wherein the data that, when accessed by the processing device, further causes the processing device to process one thread of the concurrent stack for messages to a same service from the same server.

13. The non-transitory machine-accessible storage medium of claim 8 wherein the messages comprise packets with the concurrent transport protocol stack, wherein the concurrent transport protocol stack comprises at least one of a multicast receiver thread, a unicast receiver thread, or a connection table.

14. The non-transitory machine-accessible storage medium of claim 8 wherein the data that, when accessed by the processing device, further causes the processing device to send the messages up the concurrent transport protocol stack to a corresponding channel of a channel layer, a building block layered on top of the channel layer, and an application programming interface layered on top of the building block.

15. A method comprising:

maintaining, by a processing device executing a multiplexer, a set of queues, one queue per service name;

maintaining, by the processing device executing the multiplexer, a thread pool, wherein the thread pool is coupled to receive messages from the set of queues, wherein the thread pool comprises a regular thread pool and an out-of-bound thread pool;

receiving messages from a plurality of servers by the processing device executing the multiplexer;

associating, by the processing device executing the multiplexer, a service name to each message with a corresponding destination service;

adding, by the processing device executing the multiplexer, a message to a corresponding queue in view of the service name of the corresponding queue;

forming a single shared channel by the multiplexer; and processing the messages from the set of queues with the thread pool over the single shared channel, wherein processing the messages comprises:

forming one thread from the regular thread pool for the messages from a sender, and forming one thread from the out-of-band thread pool for the messages marked as out of band from the sender, wherein the messages processed with the one thread from the out-of-band thread pool are processed before the messages processed with the one thread from the regular thread pool.

16. The method of claim 15 further comprising:

multiplex the messages onto the single shared channel; and sending the messages over the single shared channel.

17. The method of claim 15 further comprising:

determining, by the processing device executing the multiplexer, the service name for each message from the single shared channel; and channeling each message to the corresponding destination service in view of the service name of each message.

18. The method of claim 15 further comprising concurrently dispatching, by the thread pool, the messages to different services from a same server.

19. The method of claim 15 wherein the processing the messages further comprises processing the messages to a same service from a same server using one thread.

20. The method of claim 15 wherein receiving messages comprise packets with concurrent transport protocol stack, wherein the concurrent transport protocol stack comprises at least one of a multicast receiver thread, a unicast receiver thread, or a connection table.

* * * * *